June 6, 1933.   G. A. COUNTRYMAN   1,912,475
TOOL FOR USE IN REPAIR WORK ON AUTOMOBILES
Filed March 28, 1929   5 Sheets-Sheet 1
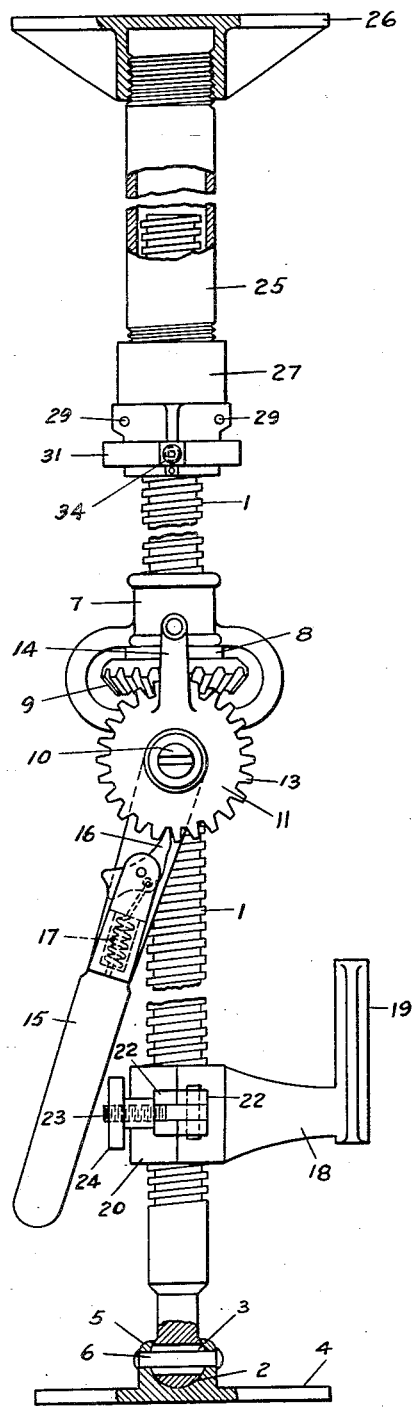
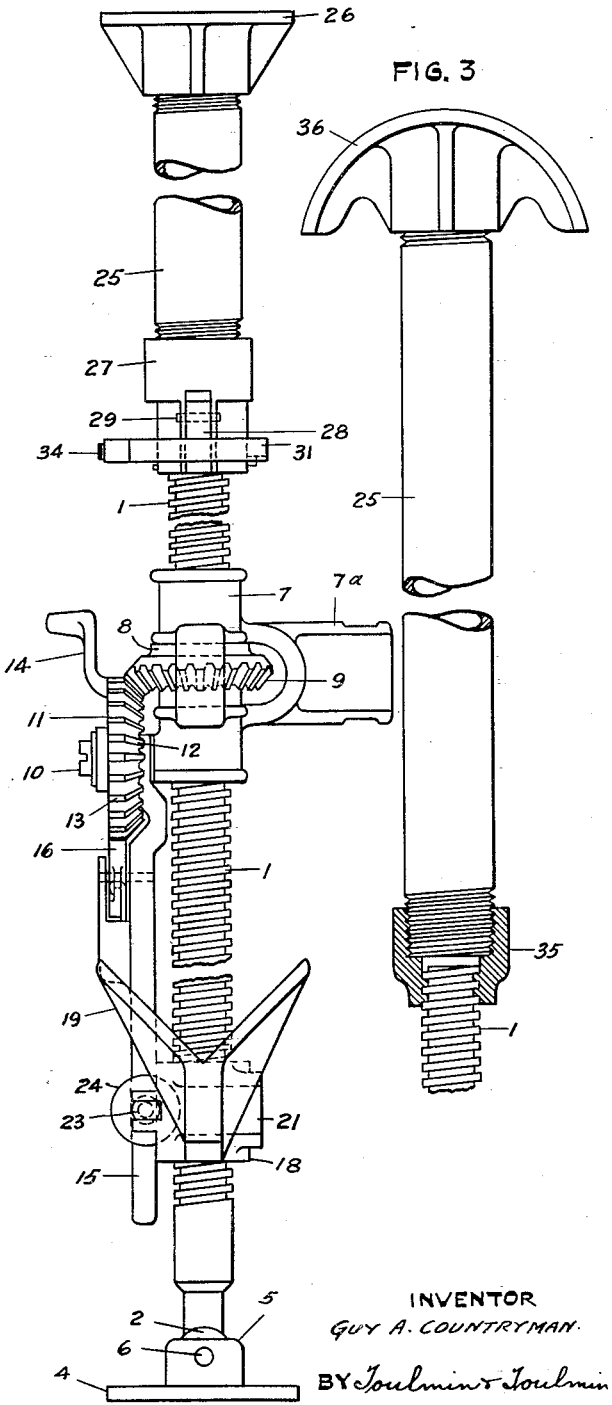
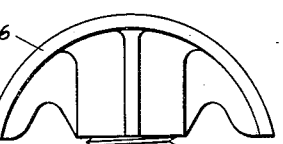
INVENTOR
GUY A. COUNTRYMAN
BY Toulmin & Toulmin
ATTORNEYS

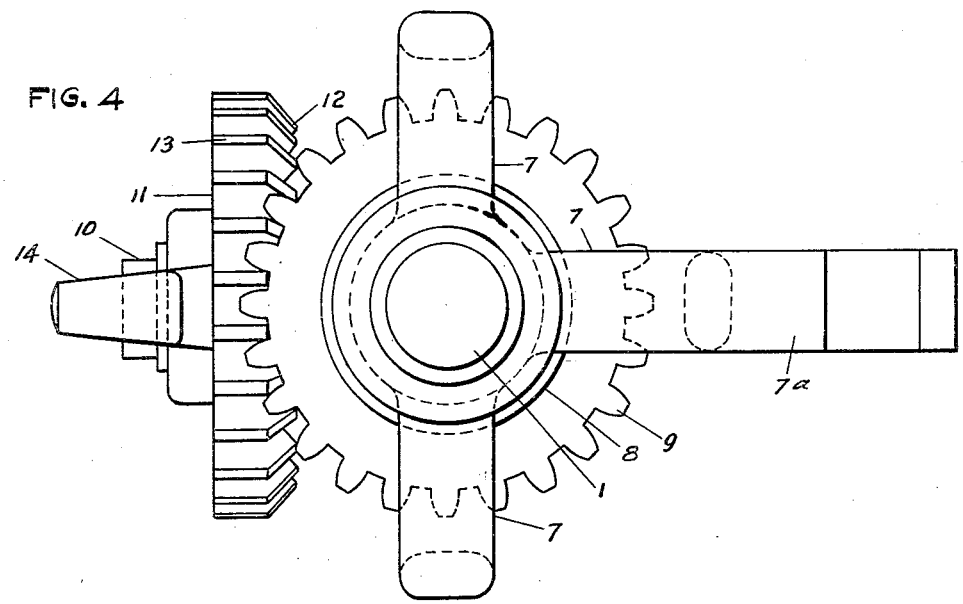
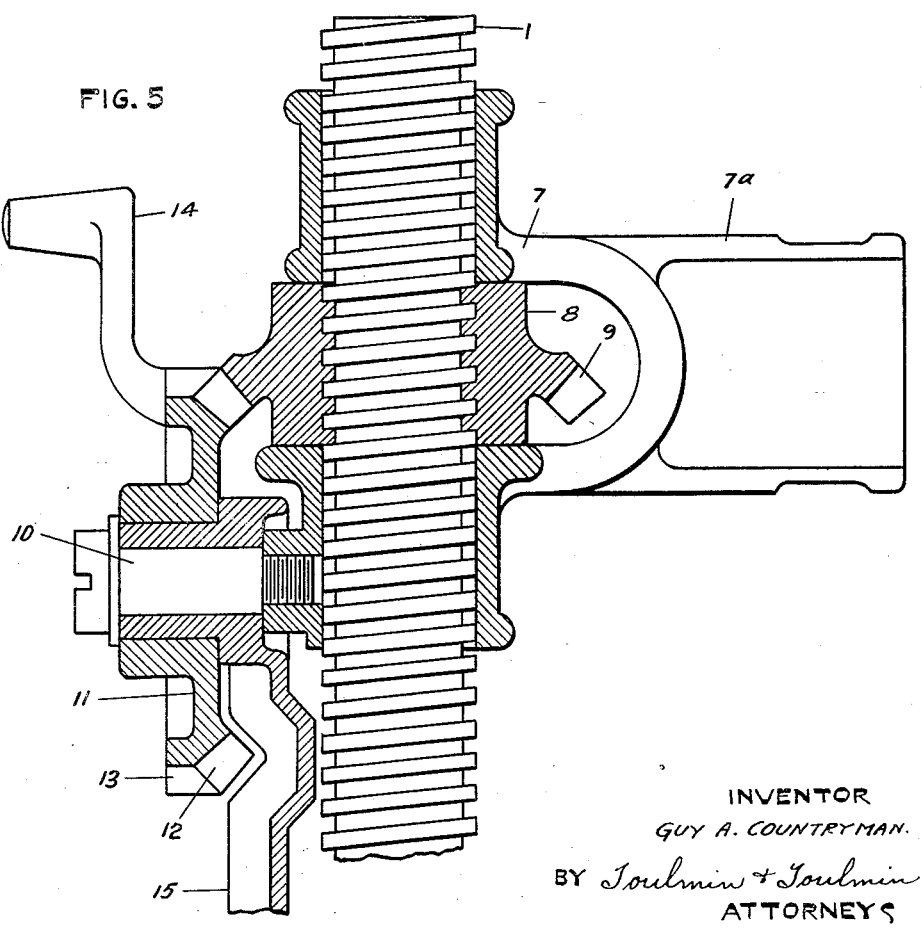

June 6, 1933.  G. A. COUNTRYMAN  1,912,475
TOOL FOR USE IN REPAIR WORK ON AUTOMOBILES
Filed March 28, 1929  5 Sheets-Sheet 3
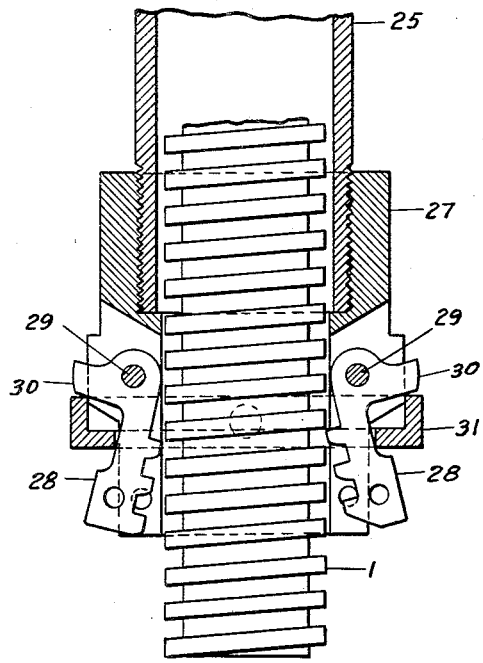
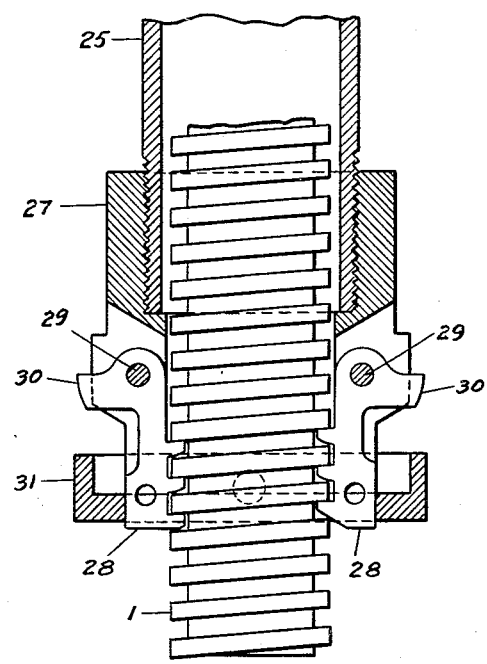
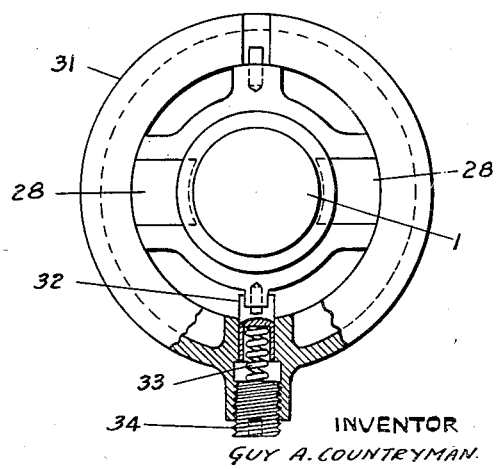
INVENTOR
GUY A. COUNTRYMAN.
BY Toulmin + Toulmin
ATTORNEYS INVENTOR
GUY A. COUNTRYMAN.
BY Toulmin + Toulmin
ATTORNEYS

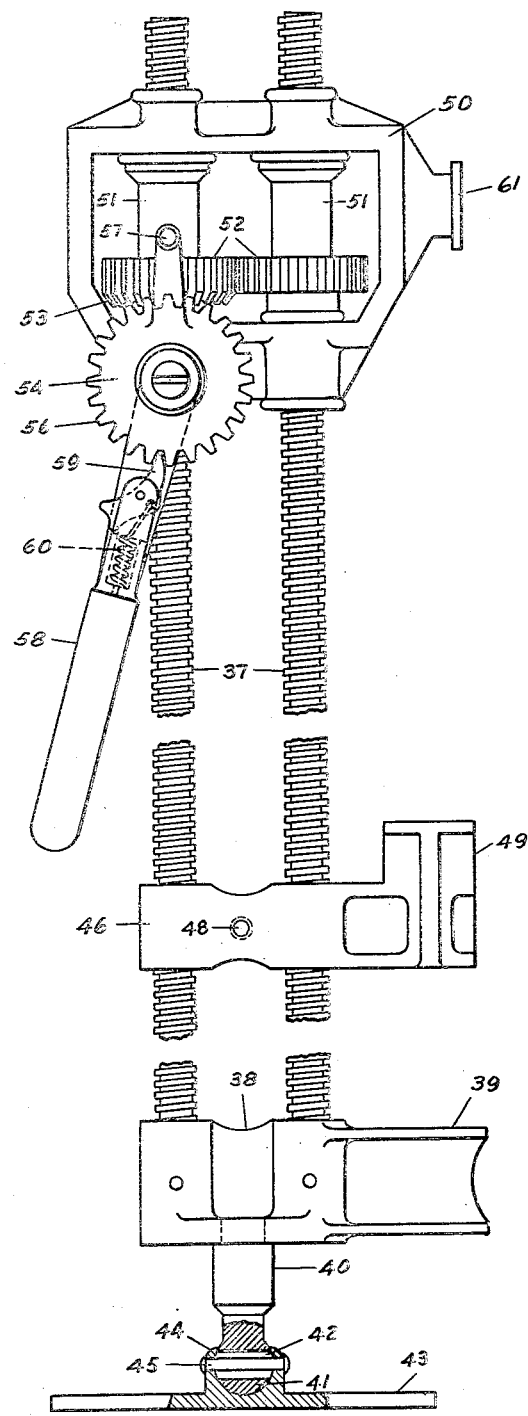
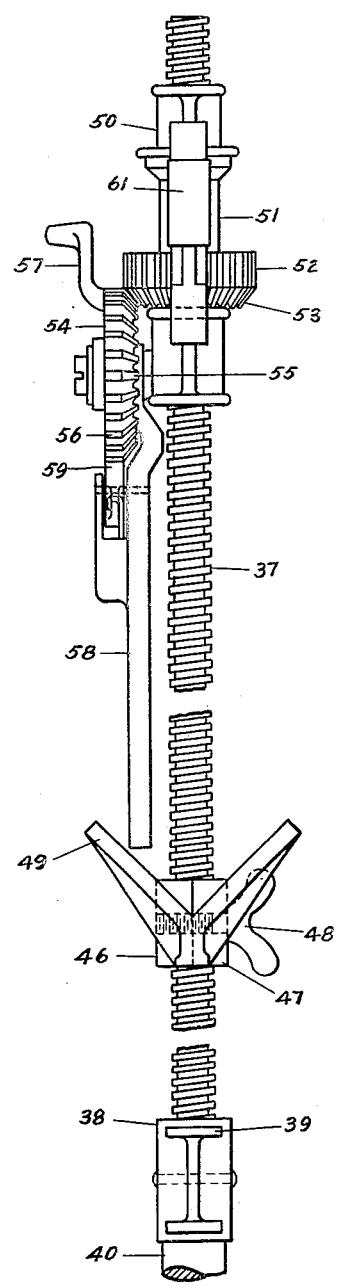

Patented June 6, 1933

1,912,475

UNITED STATES PATENT OFFICE

GUY A. COUNTRYMAN, OF ASHLAND, OHIO

TOOL FOR USE IN REPAIR WORK ON AUTOMOBILES

Application filed March 28, 1929. Serial No. 350,696.

This invention relates to improvements in tools for use in connection with garages and repair shops for the repair of automobiles.

It particularly has for its object the provision of a jack that has adjustable work-engaging elements which can be adjusted for either pulling or pushing.

It also has for its object the provision of work-engaging elements of various shapes and forms so as to conform to the shape of the work.

It is also an object of this invention to provide a tool of this kind that is adjustable in length and can be readily adapted to the work space available.

It is particularly the object of this invention to provide, in connection with the screw jack for use in the repair of automobiles, a work-engaging element that can be removed from and placed upon the screw part of the jack and may be adjusted so as to apply to the work either a pulling or a pushing direction.

It is also an object of this invention to provide an extension that will fit and engage the screw part of the jack, and to engage the threads thereon and be easily removed and placed thereon.

These and other advantages will appear from the following description, taken in connection with the drawings.

Referring to the drawings:

Figure 1 is a view of one form of the jack partly in section.

Figure 2 is a view of the same form taken at right angles to Figure 1.

Figure 3 is a view showing one of the extension pipes, and the manner in which it is attached to the screw.

Figure 4 is a view of the operating mechanism for operating the screw nut.

Figure 5 is a cross section of the parts shown in Figure 4.

Figure 6 shows a means for attaching the extension pipe to the screw, showing the pawls with screw threads thereon for engaging the screws of the rod.

Figure 7 is a view similar to Figure 6, showing the pawls in engagement with the threads of the rod.

Figure 8 is a plan view of a ring for holding the pawls, shown in Figures 6 and 7 in engagement with the threads of the rod.

Figure 13 is a view partly in section of a tool in which there are two screw rods.

Figure 14 is a view taken at right angles to Figure 13.

Figure 9:
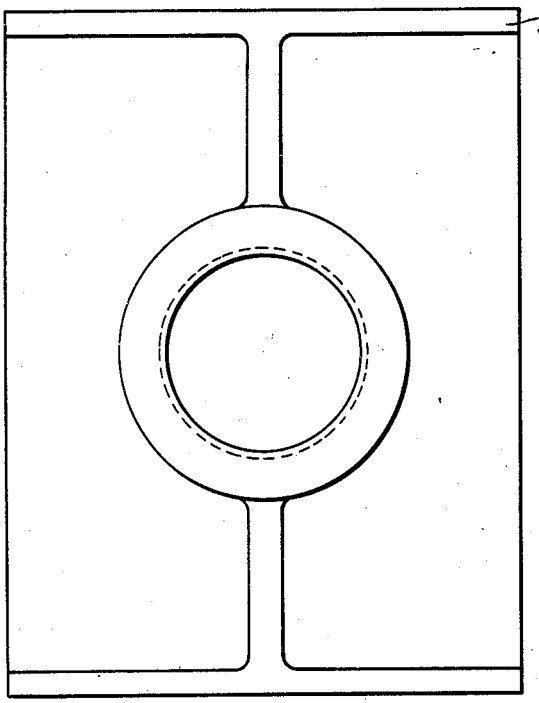
Figures 9 and 10 show different views of one form of work-engaging head adapted to fit on the end of the screw rod.

In Figures 1 and 2 there is shown one form of the tool having assembled therewith one of the extension elements. The numeral 1 is used to designate a screw rod, which has on one end thereof a ball 2. This ball has extending therethrough an elongated hole 3. The numeral 4 is used to designate a foot plate, which has on one side thereof a socket 5. This socket is adapted to receive the ball on the end of the screw rod and to provide a seat for the ball during the operation of the foot.

Extending through the socket and the hole in the ball is a pin 6. This pin fits in the hole 3 in such a way as to permit the rocking of the screw rod on the foot plate in every direction. The numeral 7 is used to designate a housing adapted to house the nut which operates the jack. Extending from the housing is a work-engaging arm or lug 7a. This housing is U-shaped in form, having on each end of the U a hole through which the screw rod passes and between which is a working nut 8, which engages the threads on the screw rod for the purpose of operating and moving the housing and the lug thereon.

On this nut are gear teeth 9. Extending from one part of the housing is a stub shaft 10 which carries a gear wheel 11, which has teeth 12 meshing with the teeth 9 on the nut. There are also on the outer periphery of this gear wheel ratchet teeth 13. Extending from the gear wheel 11 is a handle 14 for use in rapid rotation of the nut for adjusting purposes.

For operating the gear wheel and the nut there is provided a lever 15 which has thereon a pawl 16 operated on by a spring 17. This pawl is shiftable from one position to another for the purpose of reversing the rotation of the gear wheel 11, and when in either of its positions is held in that position by means of the spring 17.

The tool as thus described is useful for general purposes, having a foot 4 and a work-engaging lug 7a, but it has often been found advantageous to have an additional and adjustable work-engaging means and for that purpose there is provided a work-engaging bracket, one section of which is indicated by the numeral 18, which carries a work-engaging seat 19. The other section is indicated by the numeral 20 and is in hinged connection with the first section 18, the hinge being indicated by the numeral 21.

Each of these sections carries a pair of lugs 22. Between the pair on one section is hinged a lock bolt 23, which is adapted to extend between the pair on the other section, and when thus extended is held in engagement therewith by means of a nut 24 which engages the second pair of lugs. Each section is internally threaded so as to engage the threads of the screw rod, and by means of the bolt 23 and the nut 24 can be applied to the screw rod in such a way as to prevent rotation and movement of the work-engaging seat 19 thereon. This attachment may be placed at any desired position on the screw rod, and may be reversed with the seat toward the operating mechanism, or in the direction opposite thereto. While in the present illustrations the member 18 is attached to the screw rod between the foot and the nut, it may be placed in any position thereon.

There is also shown in Figures 1 and 2 a readily adjustable extension adapted to be slipped over the end of the screw rod opposite the foot 4, and be quickly and securely attached thereto. This extension consists essentially of a pipe 25 screw threaded at both ends, on one end of which is a head 26. This head may be of any desired shape and form. In Figures 1 and 2 it is shown to be flat, while in Figure 3 this head is shown to be circular, adapted to fit work that is of this shape. On the end of the pipe 25, opposite the head, is an attachment sleeve 27. This sleeve and its associated parts are more fully shown in Figures 6 and 7.

At one end of this sleeve, and at opposite points thereon, there are pawl members 28 pivoted at the point indicated by the numeral 29. Each pawl has extending therefrom adjacent the pivot an ear 30. Each of these pawls has screw teeth to engage the screw teeth of the screw rod 1, and when the teeth are in engagement with the screw rod the sleeve may be rotated thereon for longitudinal movement in relation to the screw rod, or the two parts may remain stationary as desired.

For the purpose of holding the threads of the pawls in engagement with the threads of the screw rod there is provided a locking ring 31. This locking ring has two positions. In Figure 6 it is shown in contact with the ears 30 for the purpose of throwing the pawls out of engagement with the threads of the rod, while in Figure 7 the ring is in position to hold the pawls in engagement with the threads on the rod. By merely shifting the ring longitudinally of the rod the pawls may be thrown into or out of engagement with the teeth of the rod and permit a ready adjustment of the extension pipe on the screw rod.

For the purpose of preventing any unnecessary slipping of the locking ring there is provided a plunger 32, suitably located in some part of the ring in the hole therein. This plunger is forced into engagement with the coacting part of the sleeve for preventing the ring from moving longitudinally of the sleeve. For the purpose of forcing this plunger in there is provided a spring 33, which may be compressed by means of a screw 34.

When the pawls 28 are released the pipe or sleeve 25 may rest on the housing 7. When the pipe or sleeve 25 thus rests upon the housing 7 it moves with the housing along the rod and constitutes with the housing a work-engaging means. In order that this sleeve or pipe may rest upon the housing, free from contact with or support by the screw rod, the pawls 28 are held out of engagement with the threads of the rod by means of the locking ring 31. For this purpose the locking ring is held in its upward position so that the pawls are tripped and held in this position, free from contact with the threads of the screw rod.

While the sleeve is shown in connection with a screw rod, yet any other form of rod may be used that is capable of receiving the sleeve and that can be gripped by a gripping means thereon. A smooth rod may be used for this purpose.

Instead of having the form of attachment between the pipe 25 and the screw rod 1 here shown and described, a simple sleeve such as 35 shown in Figure 3 may be used. This sleeve, however, permits of slow adjustment and is merely fitted over the end of the pipe 25 and the end of the screw rod 1. However, the adjustment shown in Figures 1 and 2 permits of rapid and variable adjustment not possible with the form shown in Figure 3. In the form shown in Figure 3 the screw rod may be made to extend some distance into the pipe 25. On the end of the pipe 25, as shown in Figure 3, there is a circular head 36. However, any form of head may be used.

Figure 10:
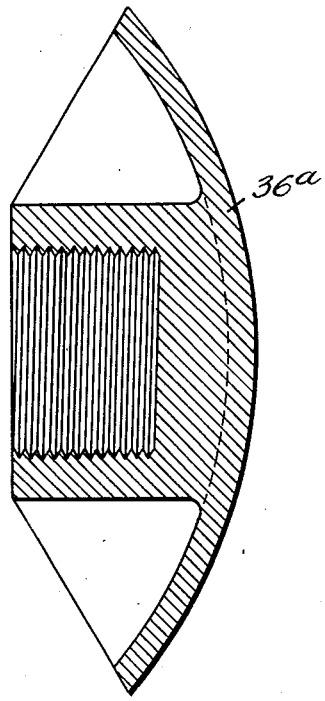
Figure 11:
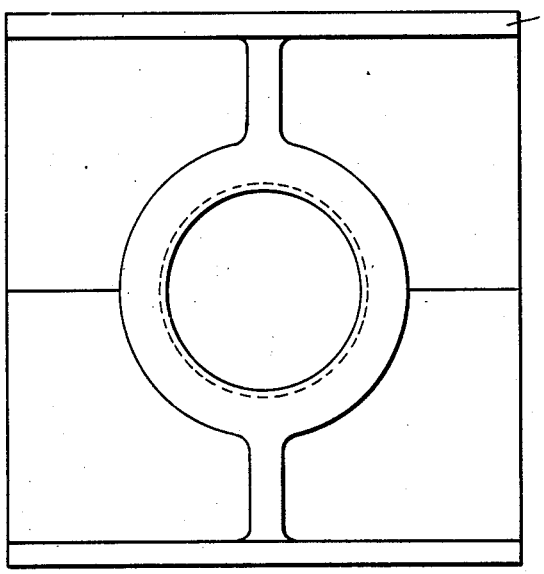
Figures 11 and 12 show different views of another form of work-engaging head adapted to fit on the end of the screw rod.
Figure 12:
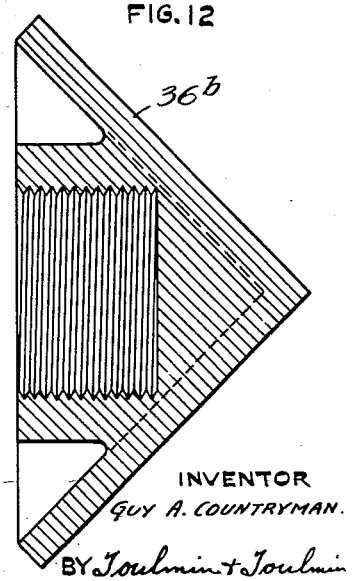

In each of Figures 9, 10, 11 and 12 there are shown different forms of heads 36a. In Figures 9 and 10 the head is circular in shape, similar to that shown in Figure 3 but not on quite so small a radius. In Figures 11 and 12 the head 36b is triangular in shape and adapted to fit into corners and places of that shape. These heads are adapted to fit on the end of the pipe 25. However, they may be adapted for use on the end of the screw rod.

In Figures 13 and 14 there is shown a modified form of jack in which there are two screw rods indicated by the numeral 37. These screw rods are parallel with each other and of the same length and have on one end thereof a bracket 38, which has an outstanding work-engaging arm 39. Extending from the bracket 38 is an extension 40, which has on the end thereof a ball 41 with a hole 42 therein elongated for the reception of a coacting pin. In this form of jack there is a foot plate 43, which has a socket 44 for the reception of the ball. For the purpose of holding the socket and ball in coacting relation with each other there is a pin 45, which extends through the hole 42 in the ball and permits of a limited amount of rotary and rocking movement of the foot plate on the ball.

There is also provided in this form of tool an adjustable work-engaging bracket, one part of which is indicated by the numeral 46 and the other part by the numeral 47. These parts have seats with threads therein for accommodating the screw rods, and when the parts are brought together in engagement with the screw rods they may be held in engagement therewith by means of a screw 48. These parts are separate and are controlled entirely by the screw 48. This attachment may be readily adjusted longitudinally of the rods by the simple operation of the screw 48, and when in adjusted position affords a firm work-engaging bracket with a work-engaging seat similar to that shown in relation to Figures 1 and 2 and indicated by the numeral 19. The work seat is indicated by the numeral 49 and is part of the part 46.

There is also provided in connection with these screw rods a housing 50. This housing carries two nuts 51, one for each of the screw rods. Each nut has thereon a gear 52 in mesh with each other so that on the rotation of one both will rotate. On one of these gears is a second set of gear teeth 53, which mesh with the teeth 55 on a gear 54. This gear is suitably mounted on some part of the housing for rotation, and has on the outer periphery thereof ratchet teeth 56.

The gear 54 also has a handle 57 for use in rapid adjustment of the housing on the screw rods, but for the purpose of operating the nuts during load there is provided a lever 58 which carries a pawl 59 for engagement with the ratchet teeth. This pawl is held in adjusted position by means of a spring 60. The pawl may be shifted for rotation of the parts in different directions so that the housing may be moved either for pulling or pushing purposes.

The housing carries also a work-engaging bracket 61. While there is only one work-engaging element shown in connection with the housing 50, others may be used and even part of the bracket between the screw rods may be used for engagement with the work.

I desire to comprehend within my invention such modifications as may be clearly embraced within my claims and the scope of my invention.

Having thus fully described my invention, what I claim is new and desire to secure by Letters Patent, is:

1. In an automobile repair tool, a body member, a member on said body member adapted to move longitudinally thereon, and an adjustable work-engaging member on said body member, said work-engaging member consisting of two members hinged together, and means to clamp said hinged members to said body member.

2. In an automobile repair tool, a screw rod, a work-engaging means on said rod adapted to travel thereon, and a second work-engaging means adjustably mounted on said rod, said last-named means including a sleeve having toothed pawls to engage the threads of the rod and a ring to hold the pawls in engagement with the threads of the rod.

3. In an automobile repair tool, a screw rod, a work-engaging means on said rod adapted to travel thereon, and a second work-engaging means adjustably mounted on said rod, said last-named means including a sleeve having toothed pawls to engage the threads of said rod, and a ring to hold said pawls in engagement with said rod.

4. In an automobile repair tool, a screw rod, a work-engaging means on said rod adapted to travel thereon, and a second work-engaging means adjustably mounted on said rod, said last-named means including a pipe having a sleeve thereon, a pair of toothed pawls on said sleeve to engage the threads of said rod, and a ring to lock said pawls in engagement with said threads.

5. In an automobile repair tool, a screw rod, a work-engaging means on said rod adapted to travel thereon, and a second work-engaging means adjustably mounted on said rod, said last-named means including a sleeve having toothed pawls to engage the threads on said rod, a ring to hold said pawls in engagement with said rod, and means on said ring to hold it positioned on said sleeve.

6. In an automobile repair tool, a screw rod, a work-engaging means on said rod adapted to travel thereon, and a second work-engaging means adjustably mounted on said rod, said last-named means including a pipe having a sleeve thereon, a pair of toothed pawls on said sleeve to engage the threads of said rod, a ring to lock said pawls in engagement with said threads, and means on said ring to hold it positioned on said sleeve.

7. In an automobile repair tool, a screw rod, a work-engaging means on said rod adapted to travel thereon, and a second and adjustable work-engaging means on said rod, said last-named means consisting of a pair of parts hinged together and provided with a rod-gripping seat, clamping means, and an arm having a V-shaped work-engaging seat thereon.

8. In an automobile repair tool, a screw rod, a foot plate pivotally mounted on one end of said rod, and a head member adjustably mounted on the other end of said rod, said head member including a sleeve having a pair of toothed pawls engaging the threads of said rod and a ring to hold the pawls in engagement with the rod.

9. In an automobile repair tool, a screw rod, a foot plate pivotally mounted on one end of said rod, and a head member adjustably mounted on the other end of said rod, said head member including a sleeve having a pair of toothed pawls engaging the threads of said rod, and a ring to hold said pawls in engagement with said rod.

10. In an automobile repair tool, a rod having a work-engaging means at one end, a work-engaging means intermediate the ends of said rod adapted to travel along the rod, and a work-engaging means fitting over the other end of said rod and having means thereon to grip the rod so that it will move therewith in relation to the intermediate work-engaging means, said second work-engaging means adapted to rest upon the intermediate work-engaging means and be moved therewith along the rod when the gripping means is released.

11. In an automobile repair tool, a rod having a work-engaging means at one end, a work-engaging means intermediate the ends of said rod adapted to travel along the rod, and a sleeve fitting over the other end of said rod and adapted to rest upon the intermediate work-engaging means and form therewith a movable work-engaging means.

12. In an automobile repair tool, a screw rod having a work-engaging means at one end, a housing having a work-engaging arm thereon, a nut rotatably carried by said housing and engaging said rod, and a pipe having gripping means adapted to fit over the other end of said rod and move therewith when the gripping means engages the rod and adapted to rest upon the housing and move therewith along the rod when the gripping means is released.

13. In an automobile repair tool, a screw rod having a work-engaging means at one end, a housing having a work-engaging means thereon, a nut rotatably carried by said housing and engaging said rod, and a pipe adapted to fit over the other end of said rod and rest upon the housing and form therewith a movable work-engaging means.

14. In an automobile repair tool, a rod having a work-engaging means at one end, a lifting means on said rod intermediate the ends thereof adapted to move along the rod, a work-engaging sleeve fitting over the other end of said rod and adapted to rest upon and be operated by said lifting means but independently removable from said rod and means on the sleeve to grip the rod so that the sleeve will move with the rod independent of the lifting means.

15. In an automobile repair tool, a rod having a work-engaging means at one end, a housing having a work-engaging means thereon, a traveling member carried by said housing and engaging said rod, and a pipe adapted to fit over said rod and rest upon the housing and form therewith a movable work-engaging means.

16. A pushing and pulling implement including a screw shaft of substantial length, a tubular extension member for said shaft screw-connected with one end thereof, power transmitting means movable lengthwise of said screw shaft having a work-engaging push and pull member laterally extending therefrom and a reversible bracket detachably and longitudinally adjustably mounted upon said shaft between the ends thereof, said bracket including two semi-cylindrical sections hinged together to permit quick adjustment and reversing of said bracket with respect to said shaft.

17. A pushing and pulling implement including a screw shaft, a tube sleeved over one end of said shaft, an interchangeable head detachably connected with the outer end of said tube, a split coupling member for coupling said tube slidably and in screwed union with said screw shaft, a yoke sleeved on said shaft having a push and pull arm extending therefrom, a nut coupled to said yoke and screw-engaged with said shaft, and means for rotating said nut at different speeds.

18. A pushing and pulling implement including a screw shaft, a power device screw-connected with said shaft, means for operating said device, a work-engaging push and pull arm projecting from said power device, and a reversible bracket mounted between the opposite ends of said shaft, said bracket having two semi-cylindrical internally screw-threaded connections hinged to each other and encircling said shaft, to permit quick longitudinal adjustment of said bracket upon said shaft, said bracket having a laterally extending forked work-engaging arm.

In testimony whereof, I affix my signature.

GUY A. COUNTRYMAN.